(12) United States Patent
Shinagawa

(10) Patent No.: US 8,272,472 B2
(45) Date of Patent: Sep. 25, 2012

(54) STEERING OPERATION DEVICE

(75) Inventor: Haruki Shinagawa, Komatsu (JP)

(73) Assignee: Komatsu Ltd., Tokyo (JP)

( * ) Notice: Subject to any disclaimer, the term of this patent is extended or adjusted under 35 U.S.C. 154(b) by 299 days.

(21) Appl. No.: 12/867,368

(22) PCT Filed: Feb. 3, 2009

(86) PCT No.: PCT/JP2009/051795
§ 371 (c)(1),
(2), (4) Date: Aug. 12, 2010

(87) PCT Pub. No.: WO2009/116329
PCT Pub. Date: Sep. 24, 2009

(65) Prior Publication Data
US 2010/0307857 A1     Dec. 9, 2010

(30) Foreign Application Priority Data

Mar. 21, 2008  (JP) .................................. 2008-073663

(51) Int. Cl.
*B62D 5/06*    (2006.01)
*B62D 5/08*    (2006.01)

(52) U.S. Cl. ........ 180/421; 180/417; 180/422; 180/432; 180/441; 180/442

(58) Field of Classification Search .................. 180/417, 180/422, 432, 441, 442
See application file for complete search history.

(56) References Cited

U.S. PATENT DOCUMENTS

| 5,732,789 | A |   | 3/1998 | Stephenson |
| 6,179,082 | B1 | * | 1/2001 | Ikari ............................... 180/418 |
| 8,087,489 | B2 | * | 1/2012 | Tanaka et al. .................. 180/422 |
| 2009/0007556 | A1 | * | 1/2009 | Djurovic et al. ................. 60/387 |
| 2010/0051376 | A1 | * | 3/2010 | Tanaka et al. .................. 180/442 |
| 2011/0197983 | A1 | * | 8/2011 | Gehlhoff ......................... 137/596 |
| 2012/0150390 | A1 | * | 6/2012 | Ruhter et al. .................... 701/42 |

FOREIGN PATENT DOCUMENTS

| JP | 5-246337 A | 9/1993 |
| JP | 10-59201 A | 3/1998 |
| JP | 11-105723 A | 4/1999 |
| JP | 2006-312411 A | 11/2006 |
| JP | 2007-106308 A | 4/2007 |
| JP | 2007-320538 A | 12/2007 |

* cited by examiner

*Primary Examiner* — Tashiana Adams
*Assistant Examiner* — Marlon Arce
(74) *Attorney, Agent, or Firm* — Global IP Counselors

(57) ABSTRACT

In a steering operation device, a hydraulic actuator is driven by hydraulic pressure and vary the steering angle of the vehicle. A steering valve adjusts the flow rate of oil supplied to the actuator according to a pilot pressure. A pilot valve adjusts the pilot pressure input to the steering valve according to a difference between a displacement of an operation input shaft and a displacement of a feedback input shaft. A joystick lever is linked to the operation input shaft and moves the operation input shaft according to a tilt angle. A drive device displaces the feedback input shaft. A steering angle sensor detects the steering angle and outputs the angle as a detected signal. A controller sends a command signal to the drive device so as to displace the feedback input shaft according to the detected steering angle.

1 Claim, 2 Drawing Sheets

STEERING OPERATION DEVICE

CROSS-REFERENCE TO RELATED APPLICATIONS

This national phase application claims priority to Japanese Patent Application No. 2008-073663 filed on Mar. 21, 2008. The entire disclosure of Japanese Patent Application No. 2008-073663 is hereby incorporated herein by reference.

TECHNICAL FIELD

The present invention relates to a steering operation device.

BACKGROUND ART

So-called joystick lever systems have been known as steering operation devices for controlling the steering angle of vehicles. In the steering operation device of a joystick lever system, the steering angle of a vehicle can be varied by an operator tilting a joystick lever provided to a driver seat.

The steering operation device disclosed in Japanese Laid-Open Patent Application No. 11-105723 includes a pair of hydraulic cylinders, a steering valve, and a pilot valve, for example.

The hydraulic cylinders extend between the front and rear parts of the vehicle body. The angle between the front and rear parts of the vehicle body, namely, the steering angle, is varied by elongating and contracting the hydraulic cylinders.

The steering valve adjusts the flow rate of oil supplied to the hydraulic cylinders according to the input pilot pressure.

The pilot valve has an operation input shaft and a feedback input shaft capable of rotating relative to each other. The operation input shaft is linked to a joystick lever and is rotated according to the tilt angle of the joystick lever. The feedback input shaft is linked to the front part of the vehicle body by a link member. The feedback input shaft is rotated by the transmission of a change in steering angle to the feedback input shaft by the link member. The feedback input shaft is thereby rotated according to the steering angle. The pilot valve adjusts the pilot pressure input to the steering valve according to the difference between the rotation angle of the operation input shaft and the rotation angle of the feedback input shaft. The steering operation device operates in the following manner when the joystick lever is operated.

The operation input shaft of the pilot valve is first rotated according to the tilt angle when the joystick lever is tilted in one direction. At that time, the steering angle has not yet been changed, and the rotation angle of the feedback input shaft is zero. The pilot valve is therefore opened at an aperture that corresponds to the rotation angle of the operation input shaft, and the pilot pressure is supplied to the steering valve. The steering valve supplies oil to the hydraulic cylinders at a flow rate that corresponds to the input pilot pressure. The hydraulic cylinders are thereby driven and the steering angle is changed.

The link member is moved by the change in the steering angle, and the movement of the link member is transmitted to the feedback input shaft when the steering angle is changed in agreement with the tilting operation of the joystick lever, as described above. The difference between the rotation angle of the operation input shaft and the rotation angle of the feedback input shaft is zero when the steering angle coincides with the tilt angle of the joystick lever. The pilot valve is thereby closed, and the steering valve is also closed. The change in steering angle is therefore stopped, and the steering angle is fixed in a state that matches the tilt angle of the joystick lever.

In the aforementioned steering operation device, a steering angle that corresponds to the tilt angle of the joystick lever can thus be obtained and the operability improved.

SUMMARY

However, in the above-described steering operation device, a pilot valve must be placed near a joystick lever because the pilot valve is linked to the joystick lever by a link member. Therefore, depending on the shape of a vehicle body, the distance from the pilot valve to the front part of the vehicle body may be large, and an excessively long link member may be necessary. In this case, it may be difficult to provide the link member.

An object of the present invention is to provide a steering operation device that can be easily operated irrespective of the shape of the vehicle body.

A steering operation device according to a first aspect has a hydraulic actuator, a steering valve, a pilot valve, a joystick lever, a drive device, a steering angle sensor, and a controller. The hydraulic actuator is driven by hydraulic pressure and configured and arranged to vary the steering angle of a vehicle. The steering valve is configured and arranged to adjust the flow rate of oil supplied to the hydraulic actuator according to a pilot pressure. The pilot valve has a moveably provided operation input member and a feedback input member, and configured and arranged to adjust the pilot pressure input to the steering valve according to a difference between a displacement of the operation input member and a displacement of the feedback input member. The joystick lever is provided so as to be able to be tilted by operation of an operator and is linked to the operation input member to cause the operation input member to be displaced according to a tilt angle. The drive device is configured and arranged to displace the feedback input member according to an input command signal. The steering angle sensor is configured and arranged to detect the steering angle and to output the angle as a detected signal. The detected signal from the steering angle sensor is input to the controller. The controller is then configured to send the command signal to the drive device so as to displace the feedback input member according to the steering angle.

In the steering operation device, a change in the steering angle is input to the controller as a detected signal from the steering angle sensor. The controller sends the command signal to the drive device, whereby the feedback input member can be displaced so as to result in a displacement that corresponds to the steering angle. Feedback of the steering angle is therefore possible without the link member being provided. Accordingly, the steering operation device can be made easier to operate irrespective of the shape of the vehicle body.

The drive device in the steering operation device is controlled electrically, but the pilot valve can also be controlled non-electrically using the operation of the joystick lever because the joystick lever and the operation input member are linked to each other. Therefore, feedback of the steering angle may become impossible if problems develop in the electrical system, but the steering angle can still be changed. A dangerous situation in which the vehicle body becomes completely unable to rotate can therefore be avoided and safety can be improved.

DETAILED DESCRIPTION OF EMBODIMENTS

1. Configuration

1-1. Overall Configuration

Figure 1:
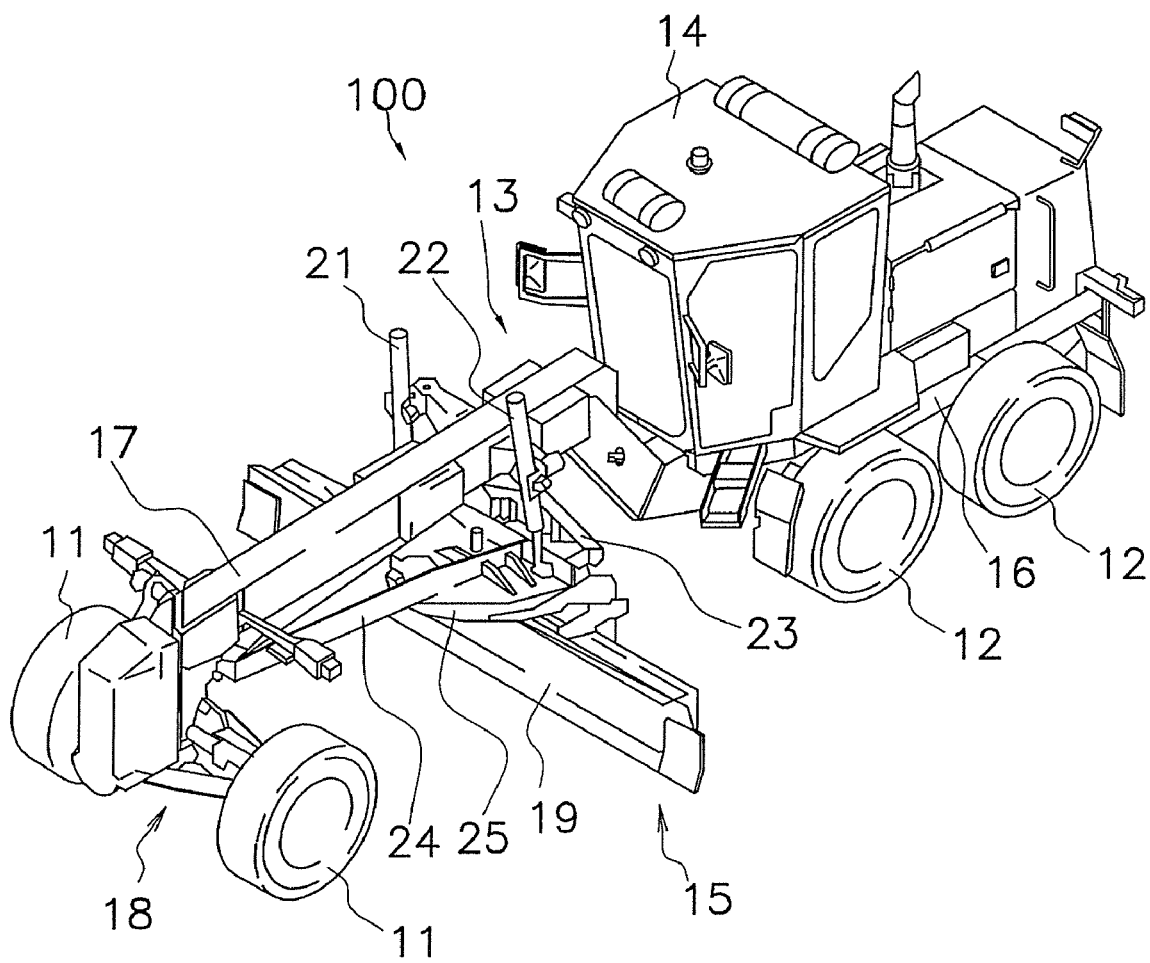
FIG. 1 is an external perspective view of a motor grader.

A motor grader 100 provided with a steering operation device 1 according to a first embodiment of the present invention is shown in FIG. 1. FIG. 1 is an external perspective view of the motor grader 100. The motor grader 100 is provided with six running wheels including a pair of left and right front wheels 11 and rear wheels 12 having two wheels on each side. The motor grader 100 can perform land grading and snow-removal work with a blade 19 provided between the front wheels 11 and the rear wheels 12. Of the four rear wheels 12, only those on the right side are shown in FIG. 1. The motor grader 100 is provided with a frame 13, a driver cab 14, and an operating unit 15.

The frame 13 is constructed using a rear-part frame 16 and a front-part frame 17, as shown in FIG. 1.

Figure 2:
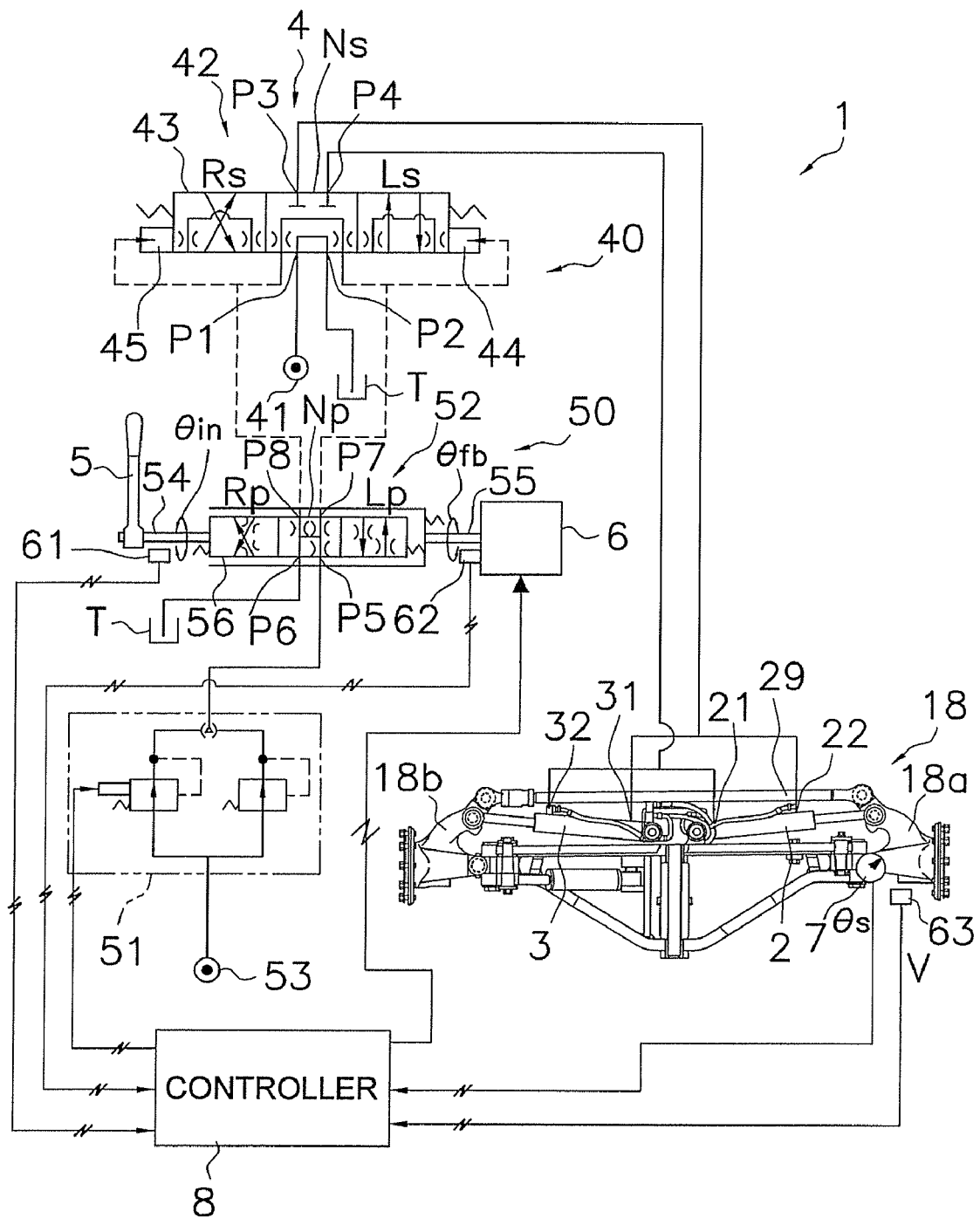
FIG. 2 is a hydraulic circuit diagram showing the structure of a steering operation device.

The rear-part frame 16 accommodates an engine, hydraulic pressure sources 41, 53, and the like (not shown here; refer to FIG. 2). The four rear wheels 12 are provided to the rear-part frame 16, and the rear wheels 12 are rotationally driven by the driving force from the engine to allow the vehicle to run.

The front-part frame 17 is attached to the front of the rear-part frame 16 and has a long longitudinally oriented shape. The front wheels 11 are attached to a front edge part of the front-part frame 17 via a front wheel support frame 18.

The driver cab 14 is mounted on the rear-part frame 16. A handle, a shift lever, and various other operation members are disposed in the interior of the driver cab 14. A joystick lever 5 described below is also disposed inside the driver cab 14.

The operating unit 15 has a blade 19, a hydraulic motor (not shown), and hydraulic cylinders 21 to 23. The blade 19 is attached to the front-part frame 17 via a drawbar 24 and a circle 25. The operating unit 15 can carry out a lifting operation for hoisting up and down the blade 19 and a tilting operation for varying the tilt of the blade 19 using the driving of the hydraulic motor and the hydraulic cylinders 21 to 23.

1-2. Configuration of Steering Operation Device 1

Described below on the basis of FIG. 2 is a configuration of a steering operation device 1 provided to the motor grader 100. The steering operation device 1 is provided with a pair of hydraulic cylinders 2, 3 used for steering, a steering hydraulic circuit 4, a joystick lever 5, a drive device 6, a steering angle sensor 7, and a controller 8.

The pair of hydraulic cylinders 2, 3 used for steering is driven by hydraulic pressure. The hydraulic cylinders 2, 3 used for steering are attached to rotating parts 18a, 18b of the front wheel support frame 18, and vary the angle of the pair of front wheels 11. The rotating parts 18a, 18b are members to which the front wheels 11 are attached, and are rotatably provided to the left and right of the front wheel support frame 18. The rotating parts 18a, 18b are linked to each other by a tie rod 29, and the angle of both is varied integrally. The angle of the front wheels 11, namely, the steering angle θs, relative to the longitudinal direction of the vehicle body of the motor grader 100 is thereby changed.

In the following description, the left-side hydraulic cylinder 2 used for steering is referred to as the "left cylinder 2," and the right-side hydraulic cylinder 3 used for steering is referred to as the "right cylinder 3."

Extension ports 21, 31 and contraction ports 22, 32 are provided respectively to the hydraulic cylinders 2, 3 used for steering. The left cylinder 2 extends and the right cylinder 3 contracts when oil is supplied to the extension port 21 of the left cylinder 2 and the contraction port 32 of the right cylinder 3 and oil is discharged from the contraction port 22 of the left cylinder 2 and the extension port 31 of the right cylinder 3. The steering angle θs is thereby changed and the vehicle turns right. The left cylinder 2 contracts and the right cylinder 3 extends when oil is supplied to the contraction port 22 of the left cylinder 2 and the extension port 31 of the right cylinder 3 and oil is discharged from the extension port 21 of the left cylinder 2 and the contraction port 32 of the right cylinder 3. The steering angle θs is thereby changed in the opposite direction of that when the right turn is made, and the vehicle turns left.

The steering hydraulic circuit 4 is a circuit for adjusting the flow rate of oil supplied to the hydraulic cylinders 2, 3 used for steering. The steering hydraulic circuit 4 has a main hydraulic circuit 40 and a pilot hydraulic circuit 50.

The main hydraulic circuit 40 is a circuit for supplying oil from a main hydraulic pressure source 41 to the hydraulic cylinders 2, 3 used for steering, and is provided with a steering valve 42. The main hydraulic pressure source 41 is constructed of a hydraulic pump, a relief valve, and the like, for example.

The steering valve 42 is a flow rate control valve whereby the flow rate of the oil supplied to the hydraulic cylinders 2, 3 used for steering is adjusted according to the input pilot pressure. The steering valve 42 has a main pump port P1, a main drain port P2, a first steering port P3, and a second steering port P4. The main pump port P1 is connected to the main hydraulic pressure source 41. The main drain port P2 is connected to an oil recovery tank T. The first steering port P3 is connected to the contraction port 22 of the left cylinder 2 and the extension port 31 of the right cylinder 3. The second steering port P4 is connected to the extension port 21 of the left cylinder 2 and the contraction port 32 of the right cylinder 3.

The steering valve 42 has a valve body 43 capable of moving to a neutral position Ns, a left steering position Ls, and a right steering position Rs. The main pump port P1 and the main drain port P2 are in communication with each other when the valve body 43 is in the neutral position Ns. In addition, the first steering port P3 and the second steering port P4 are not connected to either of the respective ports. The main pump port P1 and the first steering port P3 are in communication with each other, and the main drain port P2 and the second steering port P4 are in communication with each other, when the valve body 43 is in the left steering position Ls. The main pump port P1 and the second steering port P4 are in communication with each other, and the main drain port P2 and the first steering port P3 are in communication with each other, when the valve body 43 is in the right steering position Rs.

The steering valve 42 has a first pilot chamber 44 and a second pilot chamber 45. The valve body 43 is disposed in the neutral position Ns when the pilot pressure is not supplied to the first pilot chamber 44 and the second pilot chamber 45 and when a state is maintained in which the same pilot pressure is supplied to the first pilot chamber 44 and the second pilot chamber 45. The valve body 43 is disposed in the left steering position Ls in a state in which the pilot pressure is supplied only to the first pilot chamber 44. The valve body 43 is disposed in the right steering position Rs in a state in which the oil is supplied to the second pilot chamber 45. The steering valve 42 causes the opening area for passing the oil from the main hydraulic pressure source 41 to change according to the supplied pilot pressure when the valve body 43 is disposed in the left steering position Ls or the right steering position Rs. The steering valve 42 thereby adjusts the flow rate of oil supplied to the right cylinder 3 or the left cylinder 2 according to the pilot pressure.

The pilot hydraulic circuit 50 is a circuit for supplying oil from a pilot hydraulic pressure source 53 to the first pilot chamber 44 and the second pilot chamber 45 of the steering valve 42. A variable decompression valve 51 and a pilot valve 52 are provided to the pilot hydraulic circuit 50. The pilot hydraulic pressure source 53 has the capability to supply oil at a higher pressure than the maximum output hydraulic pressure of the variable decompression valve 51, and is constructed of a hydraulic pump for pilot use, a relief valve, and the like, for example.

The variable decompression valve 51 reduces and adjusts the hydraulic pressure sent from the pilot hydraulic pressure source 53 to the pilot valve 52. The variable decompression valve 51 can also compensate for the minimum hydraulic pressure sent to the pilot valve 52. The variable decompression valve 51 is an electromagnetic decompression valve that receives command signals from the controller 8 and controls the hydraulic pressure.

The pilot valve 52 is a valve for adjusting the pilot pressure input from the pilot hydraulic pressure source 53 to the steering valve 42. The pilot valve 52 has a pilot pump port P5, a pilot drain port P6, a first pilot port P7, and a second pilot port P8. The pilot pump port P5 is connected to the pilot hydraulic pressure source 53 via the variable decompression valve 51. The pilot drain port P6 is connected to an oil recovery tank T. The first pilot port P7 is connected to the first pilot chamber 44 of the steering valve 42. The second pilot port P8 is connected to the second pilot chamber 45 of the steering valve 42.

The pilot valve 52 has a valve body 56 capable of moving to a neutral position Np, a left pilot position Lp, and a right pilot position Rp. The pilot pump port P5, the pilot drain port P6, the first pilot port P7, and the second pilot port P8 communicate with each other when the valve body 56 is in the neutral position Np. The pilot pump port P5 and the first pilot port P7 communicate with each other, and the pilot drain port P6 and the second pilot port P8 communicate with each other, when the valve body 56 is in the left pilot position Lp. The pilot pump port P5 and the second pilot port P8 communicate with each other, and the pilot drain port P6 and the first pilot port P7 communicate with each other, when the valve body 56 is in the right pilot position Rp.

The pilot valve 52 has an operation input shaft 54 and a feedback input shaft 55. The operation input shaft 54 is provided so as to be able to rotate about a center axis. The feedback input shaft 55 is disposed coaxially with the operation input shaft 54, and is disposed so as to be able to rotate about a center axis. The valve body 56 moves among the neutral position Np, the left pilot position Lp, and the right pilot position Rp according to the difference $\Delta\theta$ between the rotational angle $\theta$in of the operation input shaft 54 and the rotational angle $\theta$fb of the feedback input shaft 55 in the pilot valve 52. The valve body 56 is disposed in the neutral position Np when the difference $\Delta\theta$ in rotational angles is zero. The pilot valve 52 causes the opening area through which oil passes from the pilot hydraulic pressure source 53 to change according to the difference $\Delta\theta$ in rotational angles when the valve body 56 is disposed in the left pilot position Lp or the right pilot position Rp. The pilot pressure sent from the pilot valve 52 to the steering valve 42 is thereby adjusted according to the difference $\Delta\theta$ in rotational angles. The pilot valve 52 is provided to the rear-part frame 16 and is disposed in proximity to the joystick lever 5. A first rotational angle sensor 61 is provided to the operation input shaft 54, and the sensor detects the rotational angle $\theta$in of the operation input shaft 54. A second rotational angle sensor 62 is provided to the feedback input shaft 55, and the sensor detects the rotational angle $\theta$fb of the feedback input shaft 55. The rotational angles $\theta$in, $\theta$fb detected by the first rotational angle sensor 61 and the second rotational angle sensor 62 are sent to the controller 8 as detected signals.

The joystick lever 5 is provided inside the driver cab 14 and is a member for being operated by the operator. The joystick lever 5 is provided so as to be tiltable to the left and right. The joystick lever 5 is linked to the operation input shaft 54, and is constructed so that the operation input shaft 54 is rotationally displaced according to the tilt angle of the joystick lever 5. Specifically, the operation input shaft 54 rotates by the same angle as the tilt angle of the joystick lever 5. The joystick lever 5 is not limited to being directly linked to the operation input shaft 54 and may also be linked via a gear, link member, or other mechanical linking structure.

The drive device 6 is an electrically driven device for causing the feedback input shaft 55 to be rotationally displaced according to an input command signal. The drive device 6 has a servomotor, for example, and the rotating shaft of the servomotor is linked to the feedback input shaft 55. The drive device 6 and the feedback input shaft 55 are not limited to being linked directly and may also be linked via a gear, link member, or other mechanical linking structure. The drive device 6 is disposed in proximity to the pilot valve 52.

The steering angle sensor 7 senses the aforementioned steering angle $\theta$s, and outputs the detected steering angle $\theta$s toward the controller 8 as a detected signal. The steering angle sensor 7 is disposed in proximity to the front wheels 11 and is constructed using a potentiometer, for example.

The controller 8 is constructed using a CPU or other arithmetic device, as well as RAM, ROM, or another memory device, and outputs a command signal to the drive device 6 and the variable decompression valve 51 by a fixed wire or wirelessly. The controller 8 can thereby control the drive device 6 and the variable decompression valve 51.

The steering angle $\theta$s detected by the steering angle sensor 7 is output to the controller 8 as a detected signal. The controller 8 sends a command signal to the drive device 6 so as to cause the feedback input shaft 55 to be displaced according to the steering angle $\theta$s. Specifically, the drive device 6 is controlled so as to rotate the feedback input shaft 55 by the same angle as the steering angle $\theta$s. The steering angle $\theta$s is thereby fed back to the pilot valve 52, and the steering angle $\theta$s can be made to change according to the tilt angle of the joystick lever 5.

The rotational angle $\theta$in of the operation input shaft 54 detected by the first rotational angle sensor 61, and the rotational angle $\theta$fb of the feedback input shaft 55 detected by the second rotational angle sensor 62 are input as detected signals to the controller 8. A vehicle speed V detected by a vehicle speed sensor 63 shown in FIG. 2 is also input as a detected signal to the controller 8. The controller 8 controls the variable decompression valve 51 on the basis of the vehicle speed V, the rotational angle $\theta$in, and the rotational angle $\theta$fb. The original pressure of the pilot pressure sent to the pilot valve 52 can thereby be controlled so as to prevent rapid changes from occurring in the flow rate Q of the oil fed to the left and right cylinders 2, 3.

2. Operation During Steering

Below is a description of operation during steering.

The operation input shaft 54 is disposed in a designated initial position, and the rotational angle $\theta$in of the operation input shaft 54 is zero when the joystick lever 5 is in a middle position. The steering angle θs is also zero. The feedback input shaft 55 is therefore disposed in a designated initial position, and the rotational angle θfb of the feedback input shaft 55 is also zero. At this time, the valve body 56 of the pilot valve 52 is disposed in the neutral position Np. In this case, the pilot pressure of the first pilot chamber 44 and the second pilot chamber 45 of the steering valve 42 is the same, and the valve body 43 of the steering valve 42 is also disposed in the neutral position Ns. There is neither supply nor discharge of oil to the left and right cylinders 2, 3, and the steering angle θs is held at zero. A detected signal showing the steering angle θs to be zero is then sent from the steering angle sensor 7 to the controller 8. The controller 8 controls the drive device 6 so as to hold the rotational angle θfb of the feedback input shaft 55 at zero because the steering angle θs is zero.

The operation input shaft 54 is subsequently also rotated in the same manner when the operator tilts the joystick lever 5 from the middle position to the left, and the rotational angle θin of the operation input shaft 54 increases. At this time, the steering angle θs is still zero because of the delay in the response of the left and right cylinders 2, 3. The difference Δθ in rotational angles therefore increases. The valve body 56 of the pilot valve 52 then moves to the left pilot position Lp, and the pilot pressure is supplied to the first pilot port P7. As a result, the valve body 43 of the steering valve 42 moves to the left steering position Ls. Oil is thereby supplied to the contraction port 22 of the left cylinder 2 and the extension port 31 of the right cylinder 3, and is discharged from the extension port 21 of the left cylinder 2 and the contraction port 32 of the right cylinder 3. The steering angle θs is thereby gradually increased from zero. The front wheels 11 are thereby turned to the left. The change in the steering angle θs is detected by the steering angle sensor 7 and is sent to the controller 8. The controller 8 controls the drive device 6 so as to bring the rotational angle θfb of the feedback input shaft 55 to the same level as the steering angle θs.

The operation input shaft 54 stops at the position of a rotational angle θ1 when the operator stops the joystick lever 5 at the position of a designated tilt angle θ1. On the other hand, the difference Δθ in rotational angles gradually decreases because the gradual increase of the steering angle θs. The difference Δθ in rotational angles then becomes zero when the steering angle θs catches up to the rotational angle θ1. At this time, the valve body 56 of the pilot valve 52 is disposed in the neutral position Np, and the pilot pressure supplied to the first pilot chamber 44 and the second pilot chamber 45 of the steering valve 42 reaches the same level. The valve body 43 of the steering valve 42 is therefore also disposed in the neutral position Ns. Oil is no longer supplied and discharged to and from the left and right cylinders 2, 3, and the steering angle θs is held at the angle θ1. In this way, the steering angle θs is also held at the angle θ1 when the joystick lever 5 is made to stop to the left at the position of the designated rotational angle θ1. The front wheels 11 are thereby turned and held to the left in the direction of the angle θ1.

The operation input shaft 54 rotates in the same manner and the rotational angle θin of the operation input shaft 54 decreases when the operator returns the joystick lever 5 to the middle position. At this time, the steering angle θs is still at the angle θ1 because of the delay in the response of the left and right cylinders 2, 3. The difference Δθ of the rotational angles therefore decreases from zero and becomes negative. The valve body 56 of the pilot valve 52 then moves to the right pilot position Rp, and the pilot pressure is supplied to the second pilot port P8. As a result, the valve body 43 of the steering valve 42 moves to the right steering position Rs. Oil is thereby supplied to the extension port 21 of the left cylinder 2 and the contraction port 32 of the right cylinder 3, and is discharged from the contraction port 22 of the left cylinder 2 and the extension port 31 of the right cylinder 3. The steering angle θs is thereby gradually reduced from the angle θ1. The change in the steering angle θs is detected by the steering angle sensor 7 and is sent to the controller 8. The controller 8 controls the drive device 6 so as to bring the rotational angle θfb of the feedback input shaft 55 to the same level as the steering angle θs.

The operation input shaft 54 is also stopped at the initial position, namely, the position in which the rotational angle θin is zero, when the operator stops the joystick lever 5 at the middle position. On the other hand, the difference Δθ in rotational angles gradually decreases because the steering angle θs also gradually decreases from the angle θ1. The controller 8 then controls the drive device 6 so as to bring the rotational angle θfb of the feedback input shaft 55 to zero, the same as the steering angle θs, when the fact that the steering angle θs has become zero is detected by the steering angle sensor 7. The difference Δθ in rotational angles is thereby brought to zero. At this time, the valve body 56 of the pilot valve 52 is disposed in the neutral position Np, and the valve body 43 of the steering valve 42 is also disposed in the neutral position Ns. Oil is thereby no longer supplied and discharged to and from the left and right cylinders 2, 3, and the steering angle θs is held at zero. In this way, the steering angle θs is also returned and held at zero when the joystick lever 5 is returned and stopped at the middle position from the designated tilt angle θ1. The front wheels 11 are thereby returned to a longitudinal direction.

The operation performed when the operator tilts the joystick lever 5 from the middle position to the right is the same as the one described above, and is therefore omitted from the description.

3. Features

The steering angle θs can be fed back to the pilot valve 52 without providing a link member in the steering operation device 1. The steering operation device 1 can therefore be more easily operated even in vehicles with a long distance between the front wheels 11 and the vehicle cab 14, as in the motor grader 100.

The drive device 6 in the steering operation device 1 is controlled electrically, but the pilot valve 52 can also be controlled non-electrically using the operation of the joystick lever 5 because the joystick lever 5 and the operation input shaft 54 are linked to each other mechanically. Therefore, even if problems develop in the electrical system, the steering angle θs can be changed. A dangerous situation in which the vehicle body becomes completely unable to turn can therefore be avoided and safety can be improved.

4. Other Embodiments

In the embodiment described above, the steering operation device 1 is mounted on a motor grader 100, but the present invention can also be used in a vehicle with a long distance between the pilot valve 52 and the mechanism for controlling the steering angle θs. The steering operation device 1 according to the present invention may be mounted on a wheel loader, for example.

In the embodiment described above, the left and right cylinders 2, 3 are used as a hydraulic actuator for varying the steering angle θs, but this is not a limitation, and other hydraulic actuators may be used.

In the embodiment described above, the pilot valve 52 adjusts the pilot pressure according to the rotational difference between the operation input shaft 54 and the feedback input shaft 55, but the pilot pressure may also be adjusted based on a difference in displacement brought about not by rotation, but by another movement.

In the embodiment described above, control is performed so that the tilt angle of the joystick lever 5 and the steering angle θs are the same, but the tilt angle of the joystick lever 5 and the steering angle θs are not limited to being exactly the same, and the tilt angle of the joystick lever 5 and the steering angle θs may increase or decrease according to a designated relationship.

In the embodiment described above, a potentiometer is described as a steering angle sensor 7, but a stroke sensor installed on the hydraulic cylinders 2, 3 used for steering may also be used instead of the potentiometer.

The above described embodiments have the effect of enhancing operability irrespective of the shape of the vehicle body, and can be used as a steering operation device.

The invention claimed is:

1. A steering operation device comprising:

a hydraulic actuator configured and arranged to vary a steering angle of a vehicle, the hydraulic actuator being driven by hydraulic pressure;

a steering valve configured and arranged to adjust a flow rate of oil supplied to the hydraulic actuator according to a pilot pressure;

a pilot valve having a moveably provided operation input member and a feedback input member, and configured and arranged to adjust the pilot pressure input to the steering valve according to a difference between a displacement of the operation input member and a displacement of the feedback input member;

a joystick lever provided so as to be able to be tilted by operation of an operator and linked to the operation input member to cause the operation input member to be displaced according to a tilt angle;

a drive device configured and arranged to displace the feedback input member according to an input command signal;

a steering angle sensor configured and arranged to detect the steering angle and to output the steering angle as a detected signal; and a controller configured to receive the detected signal from the steering angle sensor and to send the command signal to the drive device so as to displace the feedback input member according to the steering angle.

* * * * *